(12) United States Patent
Barton

(10) Patent No.: US 12,332,132 B2
(45) Date of Patent: Jun. 17, 2025

(54) PRESSURE SENSOR WITH PRESSURE COMPENSATION CHANNEL

(71) Applicant: KROHNE Pressure Solutions GmbH, Minden (DE)

(72) Inventor: Klaus-Dieter Barton, Minden (DE)

(*) Notice: Subject to any disclaimer, the term of this patent is extended or adjusted under 35 U.S.C. 154(b) by 273 days.

(21) Appl. No.: 18/163,456

(22) Filed: Feb. 2, 2023

(65) Prior Publication Data

US 2023/0243712 A1 Aug. 3, 2023

(30) Foreign Application Priority Data

Feb. 2, 2022 (DE) .......................... 102022102445.8

(51) Int. Cl.
*G01L 19/06* (2006.01)

(52) U.S. Cl.
CPC ...... *G01L 19/0609* (2013.01); *G01L 19/0618* (2013.01)

(58) Field of Classification Search
CPC . G01L 19/147; G01L 9/0072; G01L 19/0645; G01L 19/0084; G01L 13/025; G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02;

(Continued)

(56) References Cited

U.S. PATENT DOCUMENTS

| 8,821,226 B2 | 9/2014 | Yano et al. |
| 2011/0041594 A1 | 2/2011 | Eslami et al. |

(Continued)

FOREIGN PATENT DOCUMENTS

| DE | 3306711 C1 * | 7/1984 | |
| DE | 102006062044 A1 * | 4/2008 | ............. B29C 45/02 |

(Continued)

*Primary Examiner* — Andre J Allen
(74) *Attorney, Agent, or Firm* — Patrick D. Duplessis

(57) ABSTRACT

A pressure sensor is described and shown for determining the pressure of a fluid medium in a volume limited by a wall. The pressure sensor includes at least one sensor element, a sensor housing, at least one first pressure compensation channel and a protective cap. The sensor element is arranged in the sensor housing. The protective cap is connected to the sensor housing on the medium side. The sensor element is connected to the medium via the at least one first pressure compensation channel during operation. The at least one first pressure compensation channel is at least partially introduced as a recess in the protective cap. The at least one first pressure compensation channel is geometrically designed in such a way that, in order to relieve the sensor element, pressure peaks are damped by deflection and/or by increased wall friction of the medium.

15 Claims, 2 Drawing Sheets

(58) Field of Classification Search
CPC ....... G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 9/0076; G01L 7/08; G01L 9/0025; G01L 9/0035; G01L 9/0005; G01L 9/0041; G01L 19/0061; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 9/00; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 19/144; G01L 23/00; G01L 9/0094; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC .................................................. 73/700–756

See application file for complete search history.

(56) References Cited

U.S. PATENT DOCUMENTS

| | | | | |
|---|---|---|---|---|
| 2011/0198171 A1* | 8/2011 | Lux | | G01L 19/0609 188/266 |
| 2020/0348703 A1* | 11/2020 | Azzoni | | G01F 1/88 |

FOREIGN PATENT DOCUMENTS

| | | | | |
|---|---|---|---|---|
| DE | 10 2008 043 323 A1 | 5/2010 | | |
| DE | 102010001963 A1 | 8/2011 | | |
| DE | 10 2011 056 648 A1 | 6/2013 | | |
| DE | 10 2013 206 160 A1 | 10/2014 | | |
| DE | 10 2014 212 261 A1 | 12/2015 | | |
| DE | 10 2016 209 773 A1 | 12/2017 | | |
| DE | 102022119112 A1 * | 2/2024 | ............ | F16K 24/00 |
| EP | 3528604 A1 * | 8/2019 | ........... | H05K 5/0213 |
| WO | WO-03034017 A1 * | 4/2003 | ............. | E21F 17/00 |
| WO | WO-2024008356 A1 * | 1/2024 | ............. | G01L 15/00 |

* cited by examiner

PRESSURE SENSOR WITH PRESSURE COMPENSATION CHANNEL

TECHNICAL FIELD

The invention is based on a pressure sensor for determining the pressure of a fluid medium in a volume limited by a wall, comprising at least one sensor element, a sensor housing, at least one first pressure compensation channel and a protective cap, wherein the sensor element is arranged in the sensor housing, wherein the protective cap is connected to the sensor housing on the medium side, and wherein the sensor element is connected to the medium via the at least one first pressure compensation channel during operation.

BACKGROUND

Cavitation can occur in hydraulic systems under determined operating conditions. Cavitation occurs when the pressure in hydrodynamic flows is lower than the vapor pressure of the medium. This results in the formation of gas bubbles which implode abruptly, causing pressure peaks in the immediate vicinity. These can lead to erosion of the adjacent components and also damage the pressure sensors exposed to the pressure peaks.

Most static pressure sensors use pressure-sensitive diaphragms that have limited overload resistance. If these diaphragms are directly exposed to permanent pressure peaks with high frequencies or single pressure surges, permanent damage or even destruction of the diaphragm may occur.

From the prior art of DE 10 2010 001 963 A1, a pressure sensor is known which is arranged recessed with respect to the medium to be measured, wherein the medium to be measured is guided to the sensor element via a long pressure channel, and wherein an additional damping insert is arranged in the pressure channel, which damps pressure pulses that can damage the sensor element by means of a damping channel on its lateral surface.

SUMMARY

Based on the state of the art set forth, it is the object of the present invention to provide a pressure sensor that is particularly simply designed and further reduces pressure pulses that damage the sensor element.

According to a first teaching of the present invention, the above-mentioned object is achieved by a pressure sensor described at the outset in that the at least one first pressure compensation channel is at least partially formed as a recess in the protective cap, and that the at least one first pressure compensation channel is geometrically designed in such a way that pressure peaks are attenuated by deflection and/or by increased wall friction of the medium in order to relieve the sensor element.

According to the invention, it has been recognized that in the case of a front-mounted sensor element, i.e. where the sensor element is arranged close to the medium, a pressure compensation channel can be implemented in the protective cap, wherein the pressure compensation channel is designed and arranged in such a way that pressure peaks occurring in the medium are reduced so that damage to the sensor element can be avoided or at least reduced.

In contrast to the arrangement of an additional damping element in the pressure channel known from the prior art, the design according to the invention has the advantage that the pressure sensor as a whole is particularly easy to manufacture, since the means for reducing pressure peaks can be integrated into the pressure sensor without providing a separate element for this purpose.

The sensor element can, for example, be designed as a measuring diaphragm. Preferably, the deflection of the measuring diaphragm is captured by means of a strain gauge arranged on the measuring diaphragm and connected to evaluation electronics.

The protective cap is preferably designed from metal, in particular from copper, or from ceramic. For example, the protective cap is welded to the sensor housing. It is also conceivable that the protective cap is connected to the sensor housing by means of an alternative force-fit and/or material-fit connection.

The medium to be measured can be in the form of a liquid medium or a gaseous medium. According to one design, the pressure sensor is designed and arranged in the wall in such a way that a medium flowing through a pipeline, for example, can flow through the pressure sensor so that the pressure of the liquid medium can be captured. In addition, gaseous medium, in particular the gas phase of a liquid medium flowing through a pipeline, can also penetrate the pressure sensor so that the gas phase of a liquid medium can be measured.

According to a preferred design, the first pressure compensation channel is connected to a pressure chamber, wherein the pressure chamber has a larger volume than the first pressure compensation channel and wherein the sensor element measures the pressure in the pressure chamber during operation. The larger volume of the pressure chamber further improves the damping of pressure peaks according to this design.

According to a next advantageous design, the first pressure compensation channel has a cross-sectional area, wherein the shape and/or size of the cross-sectional area changes as the pressure compensation channel progresses, in particular wherein the cross-sectional area increases as the pressure compensation channel progresses toward the sensor element.

For example, the cross-sectional area can be designed to be round or oval or polygonal.

Particularly preferably, the cross-sectional area is designed to be small at least in the region where the medium enters the pressure compensation channel. This also ensures that pressure peaks are damped before they reach the sensor element.

According to a further preferred design, the first pressure compensation channel divides into at least a second pressure compensation channel and a third pressure compensation channel in the direction of the sensor element. In this way, a further reduction of pressure peaks can be achieved.

Particularly preferably, the second pressure compensation channel divides in the direction of the sensor element into at least a fourth pressure compensation channel and a fifth pressure compensation channel and/or the third pressure compensation channel divides in the direction of the sensor element into at least a sixth and a seventh pressure compensation channel. The further division of the pressure compensation channels causes a pressure wave to relax and thus further reduces the transmission of pressure peaks in the direction of the sensor element.

According to a further design, the first pressure compensation channel has a plurality of sections, wherein preferably at least one deflection element is arranged between the individual sections for deflecting the medium. Such a deflecting element can be designed, for example, as a change of direction, in particular as a kink or as a bend, in the pressure compensation channel and/or as a flow divider and/or as a separate element arranged in the pressure compensation channel. This design has the advantage that pressure peaks can be further reduced by the deflection of the medium and the associated increased friction on the wall of the pressure compensation channel.

According to a next design of the pressure sensor, a plurality of independent pressure compensation channels are provided. For example, the individual pressure compensation channels have a different cross-sectional area. However, it is also advantageous if the various pressure channels have a substantially identical shape and/or size of cross-sectional area.

Particularly preferably, the pressure sensor has a plurality of independent pressure compensation channels with a small cross-sectional area.

Preferably, at least one pressure compensation channel is oriented at least partially perpendicular to the surface of the medium. According to this design, the gas phase of a liquid medium is particularly preferably measured.

According to a next design, the pressure compensation channel is oriented at least partially parallel to the surface and/or the flow direction of a flowing medium. According to this design, a flowing medium can pass through the pressure sensor particularly easily, so that the pressure of a liquid flowing medium can also be determined particularly easily.

According to a next design, the pressure compensation channel is arranged at an angle between 0 and 90° to the preferably flowing medium.

According to one design, the pressure compensation channel is at least partially introduced as a bore in the protective cap.

It is also advantageous if at least one wave breaker is arranged in the connecting line between the opening of the first pressure compensation channel or channels into the pressure chamber and to the sensor element. For example, the at least one wave breaker can be a collar-shaped molded part that limits the gap between a ring-shaped recess of the protective cap and the sensor housing, which will be described further on. Particularly preferably, the wave breaker is designed integrally with the protective cap.

According to a further embodiment, the first pressure compensation channel has at least one change of direction in its course. Preferably, the change in direction has an angle greater than 0° and less than 180°, particularly preferably an angle between 45° and 90°. This design also has the advantage that pressure peaks are further damped by the contact of the medium with the wall.

Particularly preferably, a section of the first pressure compensation channel is designed as a ring-shaped recess in the protective cap, wherein the ring-shaped recess is preferably aligned essentially parallel to a sensor element designed as a measuring diaphragm. This design also improves the reduction of pressure peaks of the medium to protect the sensor element.

If the medium to be measured is a flowing medium, the ring-shaped recess is preferably aligned substantially parallel to the direction of flow.

According to a further preferred design, the ring-shaped recess in the protective cap forms a ring-shaped gap between the protective cap and the sensor housing.

Particularly preferably, the ring-shaped recess is designed and oriented towards the sensor housing in such a way that the medium enters the pressure chamber via a plurality of inlets. The plurality of inlets is preferably implemented by interruptions of a collar-shaped wave breaker.

According to a further preferred embodiment, at least one further sensor element is provided for measuring the medium temperature. Preferably, this further sensor element is arranged on the first sensor element designed as a measuring diaphragm.

Such a thermal sensor element can be arranged in the pressure sensor according to the invention, since the pressure sensor is arranged close to the medium, so that a temperature measurement within the pressure sensor is possible.

According to another particularly advantageous design, at least one fastening means, in particular a thread, is provided for fastening the pressure sensor in a wall. In an advantageous manner, the pressure sensor can thus simply be screwed into the wall limiting the medium, for example into a container wall or into a pipe wall.

Alternatively, the fastening means can also be designed as a collar of the sensor housing, wherein the collar has an external thread and wherein the sensor housing is fixed to the wall by means of a union nut for mounting.

In addition, the fastening means can also be designed as a collar of the sensor housing, which is fixed to the wall of the volume by means of a flange plate.

In particular, the latter two alternatives have the advantage that the pressure sensor can be oriented differently to align the pressure compensation channel or channels.

Particularly preferably, the protective cap is designed to be flat so that the sensor element is located close to the medium during operation. A flat design means that the height of the protective cap, which is oriented perpendicular to a flow direction of a flowing medium in operation, is smaller than the length of the protective cap, which is oriented in or against a flow direction of a flowing medium in operation.

BRIEF DESCRIPTION OF THE DRAWINGS

There are now a variety of possibilities for designing and further developing the pressure sensor according to the invention. In this regard, reference is made to the following embodiments in conjunction with the drawings.

DETAILED DESCRIPTION

Figure 1:
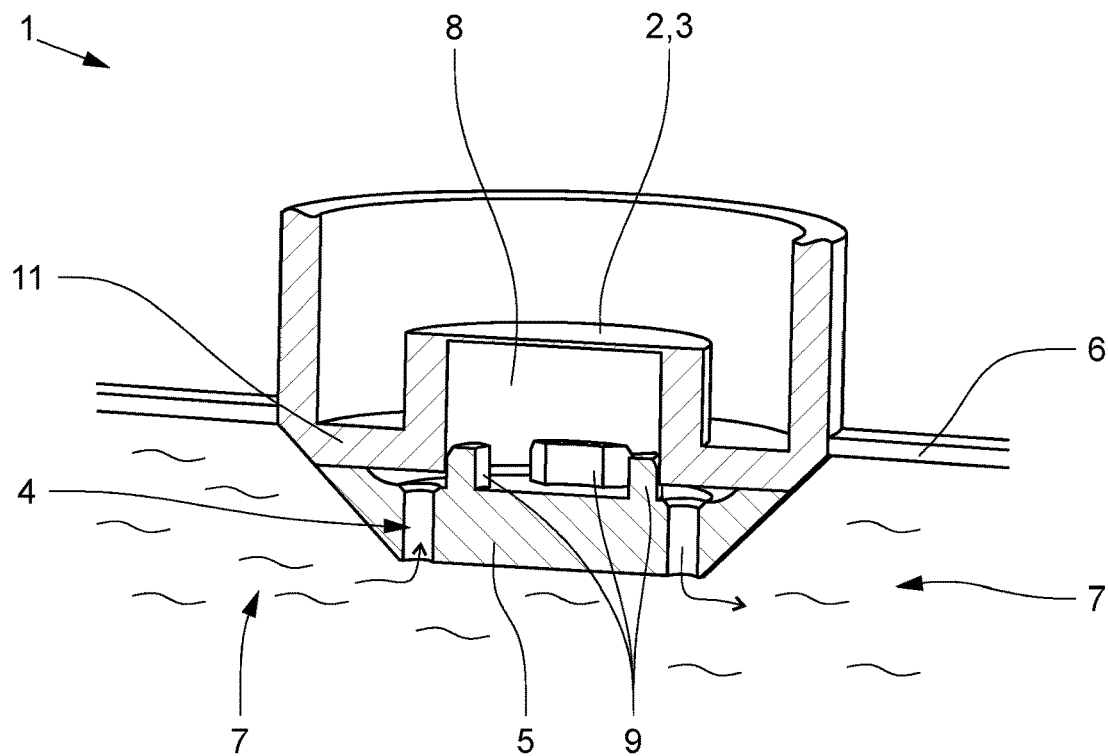
FIG. 1 illustrates a first embodiment of a pressure sensor in cross-section.

FIG. 1 shows a first embodiment example of a pressure sensor 1 for determining the pressure of a fluid medium 7 in a volume limited by a wall 6.

The pressure sensor 1 comprises a sensor element 2, which in the embodiment shown is designed as a measuring diaphragm 3. The measuring diaphragm 3 is arranged in a sensor housing 11.

In addition, the pressure sensor 1 has a pressure compensation channel 4 and a protective cap 5, wherein the pressure compensation channel 4 is introduced as a recess in the protective cap 5. The protective cap 5 is arranged on the medium side of the sensor housing 11.

In the embodiment shown, the sensor element 2 is connected to the medium 7 via the pressure compensation channel 4. To protect the measuring diaphragm 3, the pressure sensor 1 is closed on the medium side by the protective cap 5. A pressure chamber 8 is arranged in front of the measuring diaphragm 3, the pressure of which is captured by the measuring diaphragm 3. The further evaluation electronics together with the strain gauge for capturing the deflection of the measuring diaphragm 3 are not shown.

In detail, the medium enters the pressure chamber 8 through the compensation channel 4 during operation.

The pressure compensation channel 4 is geometrically designed in such a way that, to relieve the measuring diaphragm 3, pressure peaks are damped by deflection and/or by increased wall friction of the medium. In the embodiment shown, the compensation channel 4 has several sections for this purpose. The first section is designed as a bore in the protective cap 5. Through the bore, the medium 7 is guided through the protective cap 5 into a second section. The second section is designed as a ring-shaped recess in the protective cap 5. The ring-shaped recess is oriented parallel to the measuring diaphragm 3. In addition, the ring-shaped recess forms a ring-shaped gap together with the sensor housing 11. Collar-shaped wave breakers 9, which have interruptions, are arranged between the ring-shaped recess and the pressure chamber 8.

During operation, the medium 7 flows through the gaps between the wave breakers 9 into the pressure chamber 8. If the medium 7 is a flowing medium 7, it can then flow back into the container or pipe via a further pressure compensation channel 4, which is arranged downstream starting from the first pressure compensation channel 4.

The illustrated embodiment of a pressure sensor 1 has the advantage that damage to the diaphragm 3 by pressure peaks present in the medium 7 can be avoided or at least reduced, and at the same time the pressure sensor 1 can be arranged close to the medium. This has the further advantage that other properties of the medium 7, for example the temperature of the medium 7, can also be captured.

Figure 2:
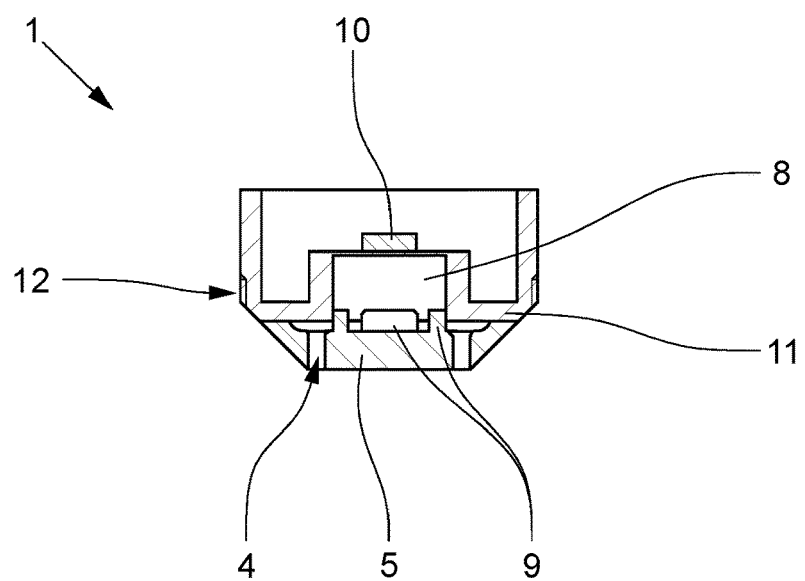
FIG. 2 illustrates a further embodiment of the pressure sensor in cross-section.

FIG. 2 shows a further embodiment of a pressure sensor 1 in cross-section. In addition to the elements already described for FIG. 1, the pressure sensor 1 has a further sensor element 10 for measuring the medium temperature. The illustrated pressure sensor 1 thus has the advantage that not only the pressure of the medium 7 but also the temperature of the medium can be captured.

In addition, the pressure sensor has threading 12, wherein the pressure sensor 1 can be screwed into a wall 6 of a volume for mounting in a particularly simple manner.

Figure 3:
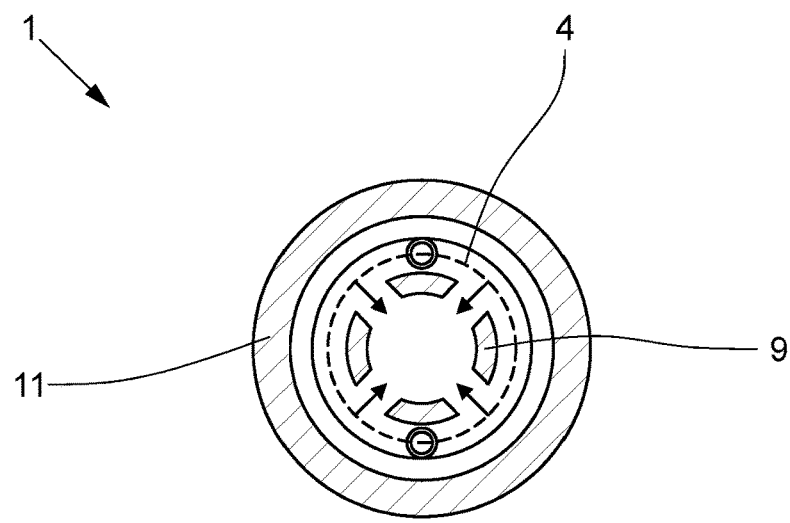
FIG. 3 illustrates a further embodiment of a pressure sensor in plan view from above.

FIG. 3 shows a further embodiment of a pressure sensor 1 in plan view. The ring-shaped recess in the protective cap 5 as well as the connection to the pressure chamber 8 through the interruptions of the wave breaker 9 are shown in detail. Due to the branching of the pressure compensation channel 4 as well as due to the constant increase of the volume, a pressure wave in the course of the pressure compensation channel 4 can be relaxed in the direction of the sensor element 2, whereby damage to the measuring diaphragm 3 can be avoided or at least reduced.

Figure 4:
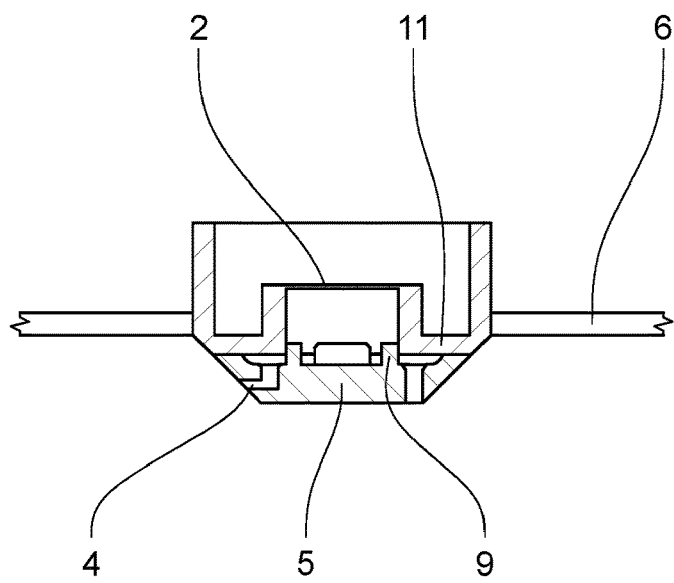
FIG. 4 illustrates a further embodiment of a pressure sensor in cross-section.

FIG. 4 shows a further embodiment of a pressure sensor 1. In contrast to the previously illustrated embodiments, the bore of the pressure compensation channel 4 in the protective cap 5 is designed at least partially parallel to the flow direction of a medium 7. In particular, a liquid medium 7 can penetrate through the protective cap 5 into the pressure chamber 8 particularly easily in this way.

The invention claimed is:

1. A pressure sensor for determining the pressure of a fluid medium in a volume limited by a wall, comprising
at least one sensor element;
a sensor housing;
at least one first pressure compensation channel; and
a protective cap;
wherein the sensor element is arranged in the sensor housing;
wherein the protective cap is connected to the sensor housing on the medium side;
wherein the sensor element is connected to the medium via the at least one first pressure compensation channel during operation;
wherein the at least one first pressure compensation channel is at least partially introduced as a recess into the protective cap; and
wherein the at least one first pressure compensation channel is geometrically designed in such a way that, in order to relieve the sensor element, pressure peaks are attenuated by deflection and/or by increased wall friction of the medium.

2. The pressure sensor according to claim 1, wherein the first pressure compensation channel is connected to a pressure chamber;
wherein the pressure chamber has a larger volume than the first pressure compensation channel; and
wherein the sensor element measures the pressure in the pressure chamber during operation.

3. The pressure sensor according to claim 1, wherein the first pressure compensation channel has a cross-sectional area;
wherein the shape and/or the size of the cross-sectional area changes in the course of the pressure compensation channel; and
wherein the cross-sectional area increases in the course of the pressure compensation channel in the direction of the sensor element.

4. The pressure sensor according to claim 1, wherein the first pressure compensation channel divides in the direction of the sensor element into at least a second pressure compensation channel and a third pressure compensation channel.

5. The pressure sensor according to claim 4, wherein the second pressure compensation channel divides in the direction of the sensor element into at least a fourth pressure compensation channel and a fifth pressure compensation channel and/or that the third pressure compensation channel divides in the direction of the sensor element into at least a sixth and a seventh pressure compensation channel.

6. The pressure sensor according to claim 1, wherein the first pressure compensation channel has a plurality of sections; and
wherein at least one deflection element for deflecting the medium is arranged between the individual sections.

7. The pressure sensor according to claim 1, wherein a plurality of independent pressure compensation channels is provided, which have a different cross-sectional area.

8. The pressure sensor according to claim 1, wherein at least one wave breaker is arranged in the connecting line between the opening of the pressure compensation channel or channels into the pressure chamber and to the sensor element and is designed in the protective cap.

9. The pressure sensor according to claim 1, wherein the at least one pressure compensation channel has at least one change of direction in its course.

10. The pressure sensor according to claim 1, wherein a section of the first pressure compensation channel is designed as a ring-shaped recess in the protective cap; and
wherein the ring-shaped recess is aligned parallel to a sensor element designed as a measuring diaphragm.

11. The pressure sensor according to claim 10, wherein the ring-shaped recess in the protective cap forms a ring-shaped gap between the protective cap and the sensor housing.

12. The pressure sensor according to claim 10, wherein the ring-shaped recess is designed and oriented towards the sensor housing in such a way that the medium enters the pressure chamber via a plurality of inlets.

13. The pressure sensor according to claim 1, wherein at least one further sensor element for measuring the medium temperature is present.

14. The pressure sensor according to claim 1, wherein at least one fastening means is present for fastening the pressure sensor in a wall of the volume.

15. The pressure sensor according to claim 1, wherein the protective cap is designed flat so that the sensor element is arranged close to the medium during operation.

* * * * *